United States Patent Office 3,698,967
Patented Oct. 17, 1972

3,698,967
METHOD OF CURING PROPELLANTS CONTAINING CARBOXYL TERMINATED POLYALKADIENES USING AN ORGANIC IRON SALT
Grant Thompson and Bobby M. Wall, Brigham City, Utah, assignors to Thiokol Chemical Corporation, Bristol, Pa.
No Drawing. Filed Jan. 29, 1964, Ser. No. 342,592
Int. Cl. C06d 5/06
U.S. Cl. 149—19                    13 Claims This invention relates to novel catalysts for curing carboxyl containing resins.

More particularly, this invention concerns catalysts for improving and accelerating the cure reaction between carboxyl containing polymers or monomers and epoxy resins, especially in the presence of perchlorate, nitrate, or other oxidizers.

The catalysts of this invention are the iron salts of carboxylic acids. Illustrative catalytic iron salts include the iron salts of saturated and unsaturated aliphatic acids. Among the more common acids are the butanoic (butyric) acids, the pentanoic (valeric) acids, the heptanoic acids and the octanoic (caprylic) acids and the like. Also contemplated are the iron salts of dicarboxylic and polycarboxylic acids, when available. These include succinic acid and glutaric acids among others.

While all of the above catalysts are satisfactory in the epoxy/carboxyl type of curing system, some compounds are preferred to other members of the group for a variety of reasons, as is the case with any large group of compounds. In this instance, the iron salt of 2-ethyl hexoic acid is the preferred catalyst because of its commercial availability, viscosity, storage stability, and handling characteristics in solid propellant formulations.

Carboxyl terminated resins, particularly carboxyl terminated hydrocarbon polymers have been used as fuel binders in solid propellant compositions. These binders are advantageous in several respect for this purpose. For example, the carboxyl terminated resins are easily combustible, burn continuously, and are compatible with various propellant oxidizers and adjuvants common to solid propellants. Additional advantages are that the resin is available in large quantities at moderate cost and that the cured resin has good high and low temperature mechanical properties and good long term storage stability.

Carboxyl terminated resins are conventionally cured by a number of well described techniques. Among these are procedures utilizing epoxy resins as the curing agents. The free epoxy and carboxyl groups interact at elevated temperatures to yield a cured polymer network having good stress, modulus of elasticity, hardness and strain values.

Unfortunately, while epoxy resins function satisfactorily as curing agents for carboxyl terminated polybutadiene gumstocks, little success has been had in curing solid propellant compositions containing these same resins. Possibly the problems have arisen because of the large proportion (20%–80% by weight) of oxidizer and propellant adjuvants which interfere with or prevent reaction between the epoxy resin and the carboxyl polymer.

Whatever the reasons may be, epoxy resins in the absence of a catalyst cannot be used to produce effective cures in solid propellant compositions containing carboxyl terminated polybutadiene and foreign materials such as perchlorate and other oxidizers. Propellants containing carboxyl terminated polymer/epoxy resin mixtures, as described in the prior art, cure with difficulty and produce compositions having poor mechanical properties, such as poor stress and strain values at a given modulus.

In addition, these prior art "cured" solid propellants which contain no iron salt catalyst frequently undergo post curing (hardening) upon long term storage at ambient or higher temperatures. The result of excessive hardening is failure of the propellant due to cracking or shattering during ignition of the solid propellant motor.

In order to overcome these curing problems, various salts reported to promote the epoxy-carboxyl reaction in gumstocks have been tried. These have included metallic salts or organic acids such as lead, nickel, manganese, tin and cobalt octoates among many others. One of these salts, namely stannous octoate, was somewhat effective in the curing of the uncompounded carboxyl terminated gumstock, but was not satisfactory where the gumstock was compounded with large quantities of perchlorate oxidizers and propellant adjuvants. In all instances, unsatisfactory cures were obtained with all the compounds described above, as well as all other compounds tested, except the iron salts of carboxylic acids.

Due to the ineffectiveness of the conventional epoxy curing agents, with or without curing catalysts in the curing of solid propellant compositions containing carboxyl terminated polybutadiene, there is a need for a novel and improved method of curing these compositions. Ideally, a satisfactory curing catalyst would be inexpensive and readily available in large quantities. In addition, the new curing method would lend itself to the cure of carboxyl terminated polymers compounded with large quantities of oxidizer, at moderate temperatures. Finally the method would produce a stable, cured composition having superior processing and physical properties. An equally important though less salient facet of this invention would be the acceleration of the curing rate of carboxyl containing resins with epoxy curing systems. These formulations would be useful as sealants, potting compositions, casting compositions, and the like.

Thus it is an object of this invention among others to disclose new catalysts for epoxy curing of carboxyl containing polymers or resins.

It is a more specific object of this invention to catalyze the epoxy cure of carboxyl containing resins even in the presence of large quantities of oxidizers and propellant adjuvants.

Still a more specific object of this invention is the curing of carboxyl containing hydrocarbon resins under these same conditions.

Yet another object of this invention is the disclosure of novel cured solid propellant prepared by the novel curing catalysts and methods of this invention.

Still another object of this invention is the development of a novel system for rapidly curing epoxy/carboxyl systems for potting, sealing and casting applications.

Further objects of this invention will become apparent to those skilled in the art after a further perusal of this patent application.

The above objects among others are achieved by incorporating a catalytic amount of the iron salt catalysts of this invention into the solid propellant components prior to the curing step. The homogeneously blended solid propellant composition containing oxidizer, carboxyl containing fuel binder, epoxy resin curing agent, and optional propellant adjuvants are then cured at elevated temperatures until the desired state of cure is reached. Since these mixing, curing, and casting procedures are well described in the propellant art, they will not be extensively described in this patent application.

The term "catalytic amount" of catalyst as used herein refers to an amount ranging between .05 to 5.0% by weight of the uncured solid propellant composition.

The formulated solid propellant compositions of this invention is composed essentially of:

(1) From about 20–80% by weight of an oxidizer such as the perchlorates, nitrates and the nitroforms or mixtures of one or more of these oxidizers. Typical perchlorates include nitronium, hydrazine, ammonium, potassium, lithium, sodium, among other perchlorates. Illustrative nitrates include ammonium among other well described in the propellant and explosives art. Hydrazine nitroform is illustrative of the nitroforms which could be used.

(2) From about 10–50% by weight of a carboxyl containing fuel binder. Among the many carboxyl containing fuel binders which can be used are the carboxyl terminated polyalkadienes such as the preferred carboxyl terminated polybutadiene. Typical of the many carboxyl containing polyalkadienes which can be employed are the following: Butarez CTL (II)—A proprietary carboxyl terminated polymer marketed by the Phillips Petroleum Corporation. HA, HB and HC polymers are three different polymers marketed by Thiokol Chemical Corporation and described in its technical and sales literature under these designations. These resins can be briefly described as follows: HA is an acrylic acid butadiene copolymer, HB is an acrylic acid acrylonitrile butadiene terpolymer, and HC is a carboxyl terminated polybutadiene polymer. These prepolymers are described in copending Ser. No. 844,821 filed Oct. 2, 1959 in the United States Patent Office.

Emery 1014—A carboxyl containing dimer acid polymer made and sold by Emery Industries.

As indicated above, many other carboxyl containing polymers, copolymers and terpolymers can be used as the fuel binder. Preferably these binders in the uncured state will range in molecular weight from about 250 to about 12,000 or even higher. Ordinarily, however, the molecular weight will range between 500–6000.

(3) From about .05 to 5% by weight or more of the novel curing catalyst can be used. Here again the source of the catalytic agent is not critical. Any of the commercially obtained iron salts of carboxylic acid can be obtained and used. If desired, the compounds can be made and/or further purified using any of the numerous procedures described in Chemical Abstracts as well as in the other technical and patent literature.

As indicated earlier iron octoate preparations are the preferred catalysts of this invention. Catalytic effects have been observed where as little as 0.1% by weight of catalyst have been used. This concentration can be increased to 1% by weight or above to accelerate the curing cycle and to shorten processing life. However, higher percentages (above 1% by weight) of catalyst do not appear to advantageously effect the physical properties of a typical ammonium perchlorate based solid propellant, and thus are not preferred.

(4) From about 0 to 30% by weight of propellant adjuvants. In addition to the curing agents, solvent, polymerization and vulcanization catalysts and the like which are included within the fuel binder content of the inventive propellant compositions, certain additives, ignition catalysts, conditioning or modifying agents can often be advantageously added to the propellant compositions to alter or improve their physical and combustion characteristics. For convenience sake, these substances are herein generically referred to as propellant adjuvants and they can be present in the finished propellant composition in amounts from up to about 30 parts by weight down to 0 part by weight of the final propellant composition.

More commonly, however, the adjuvants comprise from about 20 parts by weight or even less down to about 5 parts by weight of the gas generating composition. Among the many propellant adjuvants which can be used are included the following typical materials. Plasticizers such as the alkyphthalates and the like, and darkening agents such as carbon black or lamp black, ballistic agents such as potassium sulfate, hygroscopicity inhibitors such as dinitro-toluene and various combustion catalysts. The combustion catalysts are of diverse structure but generally are compounds containing oxygen. These catalysts can be inorganic or organic compounds. They include, among many others, oxides, such as magnesium, titanium, calcium, molybdenum, and vanadium oxides and the like. Especially effective as combustion catalysts are the chromates and dichromates, generally with ammonium dichromate being a preferred catalyst. Organics such as nitrocellulose can also be effectively used.

A favored group of adjuvants are the finely divided, high energy metals and non-metals such as aluminum, beryllium, boron, silicon, and the like. These materials can be used untreated or they can be employed in the form of the polymer coated particles.

(5) From about 1 to 10% by weight of epoxy resin stock is used. The source of the epoxy resin is not critical to the invention. Any of the numerous commercially obtained epoxy, di, tri and polyfunctional resins are satisfactory. Preferably these resins will have an epoxy equivalent weight (E.E.W.) of from about 75 to 195. However, trifunctional epoxy resins are normally used to cure difunctional polymers and vice versa. Resins containing various E.E.W.'s may be used by adjusting the quantity of epoxy resin used. Typical of the many epoxy resins which can be used, depending upon the desired result, are the following:

ERLA–0500—This is a trifunctional epoxy resin manufactured and sold by Union Carbide under this designation.

ERLA–0510—Same as above except that the resin is further purified by molecular distillation.

Epon–812—This epoxy resin is manufactured and sold by Shell Chemical Corporation under this designation. Other Epon resins which can be utilized are as follows:

Epon–828—This is a difunctional epoxy resin manufactured by Shell Chemical Corporation.

ERL–2774—This is a difunctional epoxy resin manufactured and sold by Union Carbide under this name.

ED–1000—This is a trifunctional epoxy resin made and sold by Reichold Chemical Corporation under this designation.

The composition and type of cure can be varied among other ways by adjusting the range of epoxy resin to carboxyl terminated resin either upward or downward. Ordinarily this range can vary between 96 to 70 parts by weight of carboxyl terminated resin to epoxy resin. More precise ratios can be worked out depending upon the functionally and the epoxy equivalent weight of the epoxy resin. These adjustments of epoxy resin to carboxyl resin ratio will effect physical properties such as stress, modulus of elasticity, Shore hardness and strain.

(6) Compounding the ingredients—In preparing the solid propellant compositions of the invention the following procedure among many others can be used.

The dried oxidizer (20–80 parts by weight) is reduced to a finely divided condition by grinding or some other means. From about 0.10 to 1.0 part by weight of iron catalyst and from about 15–35 parts by weight of combustible carboxyl terminated fuel binder (either prepared earlier from the reactants, or as the commercially available monomer, polymer or terpolymer) are placed in a blending vessel equipped with an efficient spark-proof mixer and the fine particles of the oxidizer are added thereto.

Also ordinarily added at this time are 0–30 parts by weight of any propellant adjuvants that are required. During these additions, efficient mixing is maintained until a homogeneous mixture results. The total mixing time necessary for a uniform mixture varies according to the batch size but ordinarily at least 30 minutes of mixing is required with 90 minutes or more representing the extremes of mixing time. Finally the epoxy curing agent or any other curing agents where necessary are added and the mixing continued for an additional ½ to 1 hours. Then the uniformly blended, uncured propellant composition is cast into an engine casing and the composition is cured at the required temperature until the desired degree of hardness is obtained. The curing time and temperatures are dependent upon the particular resin used as a binder, and the batch size, among other things, and thus cannot be stated with precision. However, the following ranges of time and temperature are typical for curing a propellant composition containing the fuel binders described below:

| Binder | Range of curing temperatures, °F. | Range of curing time, hrs. |
|---|---|---|
| Carboxyl terminated polybutadiene | 60–70 | 96–120 |
|  | 100–110 | 48–60 |
|  | 120–150 | 24–96 |
| HC polymer | 110–170 | 24–200 |
| HB polymer | 110–170 | 24–200 |
| HA polymer | 110–170 | 24–200 |

(7) Preferred propellant compositions. As indicated supra, for various reasons, certain individual components of the propellant compositions are preferred over others. Thus the preferred propellant compositions of this invention are made up of:

(1) from about 20–80% by weight of perchlorate preferably ammonium-perchlorate oxidizer.
(2) from about 10–50% by weight of carboxyl containing polybutadiene having a molecular weight ranging between 500–6000.
(3) from 0.10 to 5.0% by weight of the iron salt of 2-ethylhexoic acid.
(4) from about 4–20% by weight of an epoxy resin having E.E.W. of from about 75–195.
(5) from about 5–30% by weight of propellant adjuvants.

In one preferred embodiment of this invention, the following propellant ingredients are blended in a conventional propellant blending mixer in a conventional vessel. A 70 parts by weight portion of commercially obtained ammonium perchlorate, 11.30 parts by weight of the carboxyl terminated hydrocarbon polymer described previously as Thiokol HC polymer, 0.10 by weight of iron octoate, 18 parts by weight of aluminum and 0.60 part by weight of ERLA–0510 [1] cured at 135° F. for 120 hours to yield a cured propellant having the following properties:

Modulus (p.s.i.) _____ 600
Stress (p.s.i.) _____ 105
Strain (in./in.) _____ 0.30

In another embodiment of this invention a 70 parts by weight portion of commercially available ammonium perchlorate, 11.30 parts by weight of the above described carboxyl terminated HC polymer, 0.15 part by weight of iron linoleate, 18 parts by weight of aluminum, and 0.55 part by weight of ERLA–0510, are blended together for 45 minutes until a homogeneous propellant mixture results. The blended mixture is cured at 65° C. to yield a cured highly energetic propellant having good physical properties.

In yet another embodiment of this invention a 70 parts by weight portion of commercially derived lithium perchlorate, 18 parts by weight of the aforedescribed carboxyl terminated polybutadiene, 0.10 part by weight of iron octoate and 10 parts by weight of boron and 1.90 parts of ERLA–0510 are blended together for 20 minutes until a uniformly blended mixture is obtained. The blended mixture can be cured to a mechanically strong solid composition.

This invention is advantageous and surprising both in process and composition aspects. For example, the process of adding the iron salt catalyst compositions to a carboxyl terminated polymer/epoxy resin composition in the presence of a large amount of oxidizer and propellant adjuvants makes it practical to produce a cured solid propellant composition having satisfactory physical properties

[1] ERLA–0510 is a proprietary trifunctional epoxy resin made and sold by Union Carbide under this name.

such as stress, modulus of elasticity, Shore hardness etc. The prior art procedures and composition did not produce a satisfactory cure in this type of composition. In addition, the cured solid propellant compositions do not degrade or post cure (harden) substantially upon storage even at relatively elevated temperatures as is the case with most other curing systems.

This invention is surprising in both its process and composition aspects in that, closely related metallic salts such as manganese, cobalt, stannous and nickel octoate, as well as other iron compounds such as iron oxide do not produce a satisfactory cure with epoxy resin/carboxyl terminated polymer mixtures under conditions comparable to those under which the catalyst of this invention function.

This invention is advantageous in its composition aspect also. For example the cured compositions produced have good physical properties, are highly energetic and are stable even after prolonged storage.

As the embodiments indicate, numerous changes and modifications can be made in the experimental conditions, curing agents and the like without departing from the invention concept. This invention is best described by the claims which follow:

What is claimed is:

1. A method of producing superior cures in solid propellant compositions containing as its components a carboxyl containing hydrocarbon fuel binder, oxidizer, epoxy resin curing agent and propellant adjuvants, comprising admixing into said solid propellant composition prior to curing, a catalytic amount of an iron salt of a carboxylic acid and allowing sufficient time to elapse until a satisfactory state of cure is obtained.

2. The method of claim 1 wherein the carboxyl containing hydrocarbon fuel binder is a polyalkadiene.

3. The method of claim 2 wherein the polyalkadiene is a polybutadiene, having a molecular weight range of from about 500–6000.

4. The method of claim 1 wherein the solid propellant composition consists essentially of from about 20–80% by weight of propellant oxidizer, from about 10–50% by weight of a carboxyl terminated fuel binder, from about 1–10% by weight of an epoxy resin and necessary propellant adjuvants.

5. The method of claim 4 wherein the carboxyl terminated fuel binder is a polybutadiene having a molecular weight range of from about 500–6000.

6. The method of claim 5 wherein the cure is effected by heating to a temperature of 50°–150° F. for a period ranging from about 4 to 96 hours.

7. The method of rapidly curing a solid propellant composition having superior physical properties, said propellant composition consisting essentially of from about 10–30% by weight of a carboxyl terminated polybutadiene fuel binder, from about 50–80% by weight of a perchlorate oxidizer, from about 1–10% by weight of epoxy resin, and necessary propellant adjuvants comprising the steps of admixing a catalytic amount of iron salts into said propellant catalyst composition and curing said admixed propellant catalyst composition at elevated temperatures until a satisfactory state of cure is obtained.

8. The method of claim 7 wherein the curing step is conducted at ambient temperature.

9. The method of claim 8 wherein the iron salt catalyst is the iron salt of 2-ethyl hexoic acid.

10. The method of claim 7 wherein the perchlorate oxidizer is ammonium perchlorate, the polybutadiene has a molecular weight in the range between about 500–6000, and the cure is effected by heating to a temperature of about 50°–150° F. for a period ranging from about 24 to 96 hours.

11. A curable solid propellant compoistion consisting of from about 20–80% by weight of a propellant oxidizer, from about 10–50% by weight of a carboxyl terminated polyalkadiene fuel binder, about 1–10% by weight of epoxy resin, from about 0.05–1.0% by weight of an iron salt of carboxylic acid, and necessary propellant adjuvants.

12. The propellant composition of claim 11 wherein the iron salt catalyst is the iron salt of 2-ethyl hexoic acid.

13. The propellant compoistion of claim 11 wherein the iron salt catalyst is the iron salt of linoleic acid.

References Cited
UNITED STATES PATENTS

| 3,087,844 | 4/1963 | Hudson et al. | 149—19 |
| 3,305,523 | 2/1967 | Burnside | 149—19 |

BENJAMIN R. PADGETT, Primary Examiner